W. A. HALL.
PIPE COUPLING.
APPLICATION FILED OCT. 5, 1916.
1,257,852.
Patented Feb. 26, 1918.
2 SHEETS—SHEET 1.
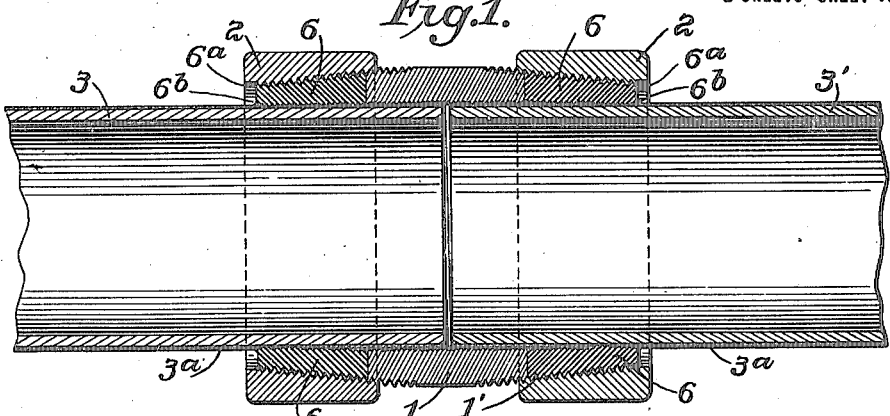
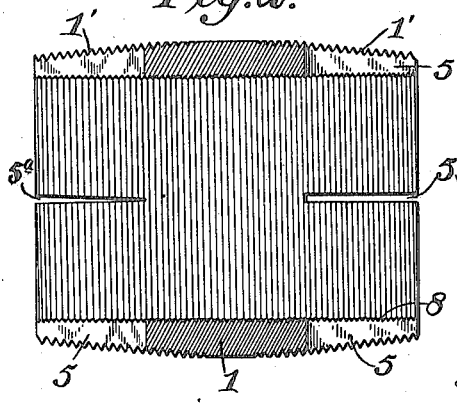
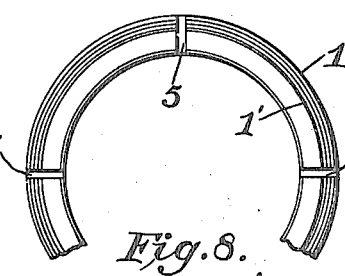
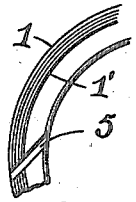
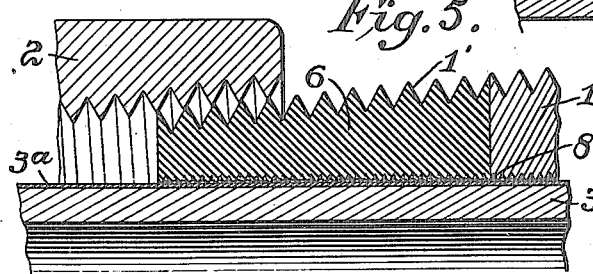
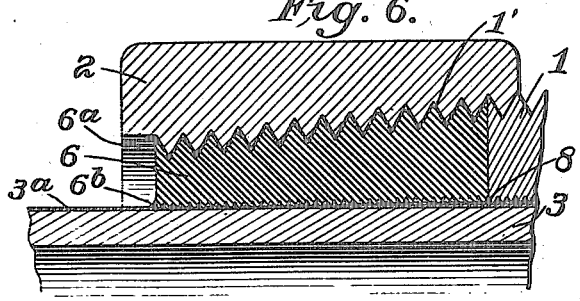
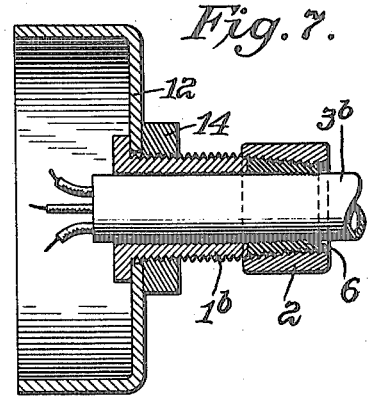
Inventor:
William A. Hall,
by Eugene C. Brown
Atty.

W. A. HALL.
PIPE COUPLING.
APPLICATION FILED OCT. 5, 1916.
1,257,852.
Patented Feb. 26, 1918.
2 SHEETS—SHEET 2.
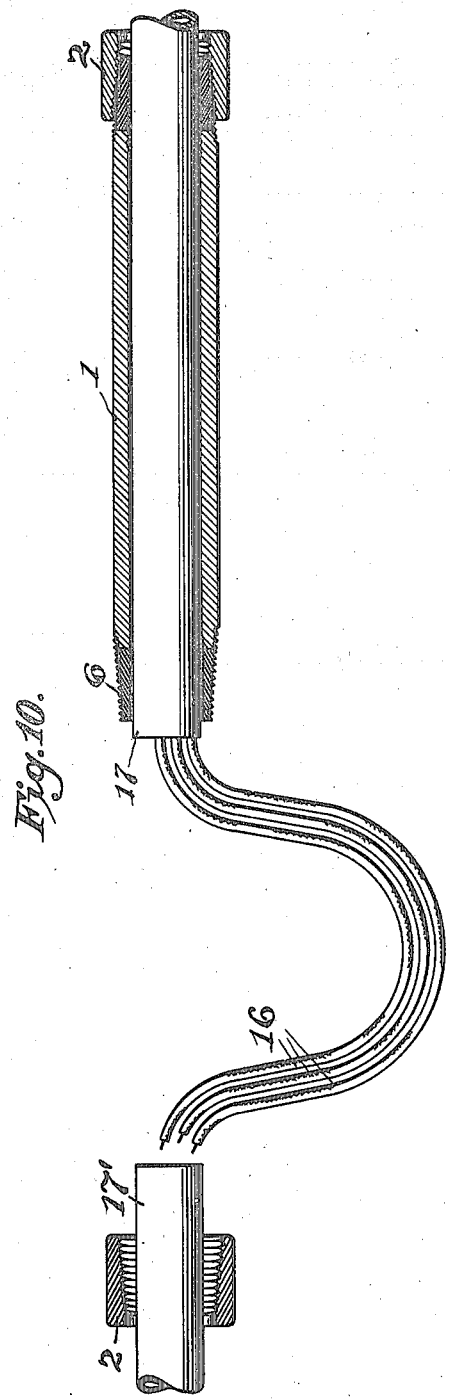
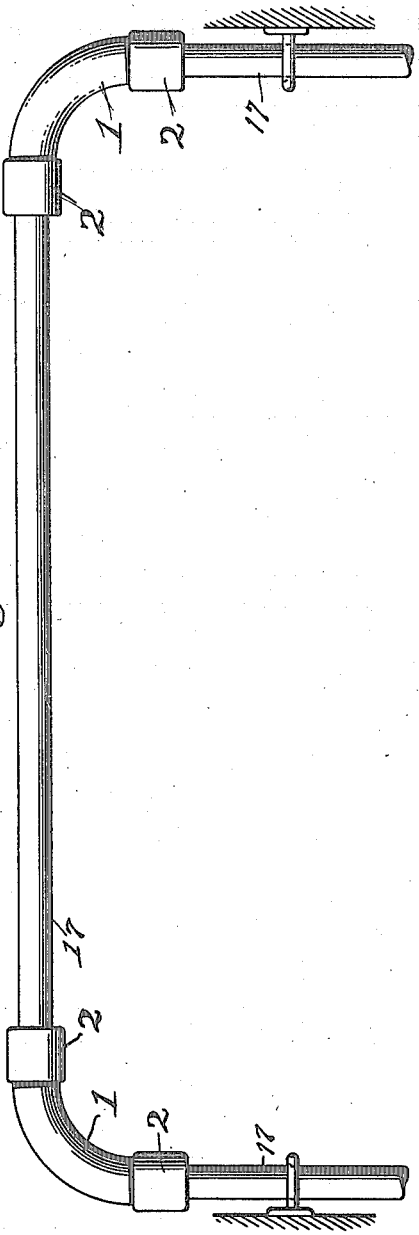
Inventor:
William A. Hall,
by Eugene C. Brown
Atty.

UNITED STATES PATENT OFFICE.

WILLIAM A. HALL, OF YONKERS, NEW YORK.

PIPE-COUPLING.

1,257,852.    Specification of Letters Patent.    Patented Feb. 26, 1918.

Application filed October 5, 1916. Serial No. 123,995.

*To all whom it may concern:*

Be it known that I, WILLIAM A. HALL, a citizen of the United States, residing at Yonkers, in the county of Westchester and State of New York, have invented certain new and useful Improvements in Pipe-Couplings, of which the following is a specification.

My invention relates to pipe couplings for connecting the ends of pipes and is especially adapted for joining the sections of conduits for electric conductors or for making the connections between lead covered cables or pipes and junction-boxes.

The main object of my invention is to provide a coupling member which will connect the ends of pipe or conduit sections without the necessity for threading said ends and which will form a moisture-proof seal at the joint or connection.

In my prior Patent No. 1,168,196, I disclosed a coupling and a method of forming sealed joints employing the usual threaded pipe ends. It is frequently desirable, however, to eliminate the necessity for threading the ends of pipes and conduit sections, especially where these must be cut to different lengths by the mechanics as the work is being installed in a building structure. Not only is much valuable time consumed in threading the pipe, which requires a certain skill, but the thread-cutting benches and tools must be taken from place to place and be moved from one part of the building to another. My present invention eliminates all of this additional labor and expense and enables the workmen to quickly connect the unthreaded ends of pipe and conduits, and at the same time insures an absolutely tight moisture-proof joint. It also avoids the necessity of making "wiped" joints where these are now required as when connecting the ends of lead covered cables to the nipples or flanged openings of junction or pull boxes.

My invention will be understood from the foregoing description in connection with the accompanying drawings in which—Figure 1 is a longitudinal section of a joint formed between the adjacent or meeting ends of pipe or conduit sections with my pipe coupling; Fig. 2 is a longitudinal section of the externally threaded contractile sleeve member of the coupling; Fig. 3 is an end view thereof; Fig. 4 is a fragmentary end view of a modification of the sleeve member; Figs. 5 and 6 are enlarged sectional detail views of a portion of the coupling; Fig. 7 is a longitudinal section of my coupling when used to connect a lead covered cable to a junction box; Figs. 8 and 9 are exaggerated detail views; Fig. 10 is a longitudinal sectional view of my coupling used as a "pull box"; and Fig. 11 is a side elevation of a pipe or conduit having the bends or angles formed by means of my couplings.

In the form of my invention illustrated in Figs. 1 and 2, the metal coupling comprises a coupling sleeve 1, having oppositely tapering externally threaded contractile end portions 1', and internally threaded collars or nuts 2, having a tapered bore to engage the threaded ends of the sleeve and contract them onto the ends of the pipe or conduit sections 3, 3', the bore of the nuts having a slightly greater inclination than the taper of the sleeve portions.

In order that the tapered portions 1' of the sleeve may yield and be gradually contracted until the ends are forced into engagement with the pipe sections when the nuts 2 are screwed into the position shown in Fig. 1, I provide a series of longitudinal slots 5, 5ª, which may either extend radially as shown in Figs. 2 and 3, or obliquely as in Fig. 4. Although the nuts 2, preferably cover the slots when in position as shown in Fig. 1, yet the joint would not be moisture-proof. I, therefore, close the slots 5, 5ª, with a filler of softer material 6, such as lead or spelter. When now the nuts or collars 2 are screwed upon the threads of the tapered portions, the opposite edges of the slots are forced toward each other, causing the lead filler to yield or flow and be partly extruded. In order that the lead may not flow or crowd too tightly into the threads, it is sometimes desirable that the lead in the slots shall not extend initially to the periphery of the sleeve. When the collar nuts 2 are screwed tight into final locked position at the larger end, the collar extends beyond the inner end of the slot and confines the soft spelter or lead filler which tends to be extruded by the increasing compression as the collar is screwed upon the threads of the tapered portion and this results in the forming an absolutely moisture-proof seal between the collar and the sleeve. The lead filler completely fills the slots and is slightly extruded at the ends, as indicated at 6ª, 6ᵇ forming a tight seal at these points. By making the slots wedge-shape, as at 5ª in Fig. 2, any compression of the slot will insure a compression of the soft filler along the entire length of the slot.

While the inner periphery of the outer ends of the sleeve is forced into such intimate contact with the periphery of the pipe 3 or with the enamel or other coating 3ª thereon, that an effective seal is produced, yet for some purposes, I prefer to also coat the inner surface or bore of the sleeve with lead or other soft material which will absolutely insure a moisture-proof seal when the ends are forced into contact with the pipe.

To further increase the frictional engagement of the sleeve with the pipe sections, I may roughen the interior surface or bore of the sleeve in any suitable manner, preferably so that there shall be slight protuberances. This may be accomplished by threading the interior with a very fine thread. This fine thread or other roughness is then coated, by plating or other means, with lead or other suitable soft material 8, as appears more clearly in the exaggerated detail Fig. 8. When the tapered portions 1' of the sleeve are contracted by forcing the nuts 2 thereover, the protuberances 10, which as stated above may be in the form of fine threads, cut through the thin lead film or coating 8, and engage the pipe or the enamel or lead covering thereon in the manner illustrated in Fig. 9. The lead coating completely closes the interstices between the threads or protuberances 10, and the pipe coating, and completes a perfect moisture-proof seal. The engagement of the protuberances or threads 10 with the pipe forms a grip between the coupling and the pipe which prevents any movement or slipping and unites the parts as effectively as a threaded joint.

In Fig. 7, I have shown the manner of employing my coupling to connect a pipe, conduit or lead covered cable to a junction box. The inner end of the coupling member 1ᵇ may be provided with a flange which bears against the inside of the box 12, and is secured in position by the lock nut 14. A sealed joint is then effected with the cable or pipe 3ᵇ by means of the contractile slotted tapered end in coöperation with the clamping ring 2. This method of connecting the pipe or cable to the junction or outlet boxes permits these boxes to be changed if desired without disturbing the piping.

In Fig. 10, I have shown how my coupling may be used in lieu of a "pull box" by employing a coupling member of sufficient length to bridge a pulling gap between two lengths of pipe or conduit. The wires or conductors 16, can be pulled from the pipe 17, and fed into the pipe 17', the parts of the coupling having first been slipped over the pipe ends in the manner shown. The pipe sections are then united by sliding the coupling member 1 across the gap with the opposite ends extending over the ends of both pipes. Sealed joints are then formed by screwing the collars 2 over the tapered ends of the coupling.

My coupling is adapted to form very strong rigid connections between the ends of pipes required to extend across a long span and to form the elbows connecting pipe sections running in different directions. In Fig. 11, I have shown the elbows or bends connecting the pipe sections formed by means of my couplings. It will be noted that the full strength of the pipe is maintained since no threads are cut into it and furthermore there are no threads to corrode.

The advantages of my pipe coupling over prior constructions and the large saving in the expense of making connections between pipe or conduit sections without the necessity for threading the pipe will be appreciated by engineers and contractors familiar with prior couplings.

I have described in detail the particular construction illustrated in the accompanying drawings for the purpose of fully disclosing my invention but it is evident that many changes and modifications can be made within the scope of my claims and without in any manner departing from the spirit of my invention.

I claim:—

1. A coupling, comprising a tubular member or sleeve adapted to surround a pipe or cable, said sleeve being provided with a slot which is closed with softer material than the main body of the sleeve, and being externally tapered and threaded, and an internally tapered and threaded collar adapted to compress said sleeve when threaded thereon, and extending over the ends of the slot to thereby confine the soft filler between the sleeve and collar as it is extruded to thereby form a completely sealed moisture-proof joint.

2. A coupling, comprising a tubular member or sleeve adapted to surround a pipe or cable and having a slot closed with a softer material than the main body thereof, said sleeve having its inner surface or bore provided with protuberances and being coated with a softer material, the ends of said sleeve being externally tapered and threaded, and an internally tapered and threaded collar adapted to compress said sleeve when threaded thereon, and extending over the ends of the slot to thereby confine the soft filler between the sleeve and collar as it is extruded to thereby form a completely sealed moisture-proof joint.

3. A coupling, comprising a tubular member or sleeve adapted to surround a pipe or cable and having a plurality of slots closed with a softer material than the main body thereof, said sleeve having its inner surface or bore provided with protuberances, the ends of said sleeve being externally tapered and threaded, and an internally tapered and threaded collar adapted to compress said sleeve when threaded thereon, and extending over the ends of the slots to thereby confine the soft filler between the sleeve and collar as it is extruded to thereby form a completely sealed moisture-proof joint.

4. A coupling, comprising a tubular member or sleeve adapted to surround a pipe or cable and having a slot closed with a softer material than the main body thereof, said sleeve having its inner surface or bore finely threaded and coated with a softer material, the ends of said sleeve being externally tapered and threaded, and an internally tapered and threaded collar adapted to compress said sleeve when threaded thereon, and extending over the ends of the slot to thereby confine the soft filler between the sleeve and collar as it is extruded to thereby form a completely sealed moisture-proof joint.

In testimony whereof I affix my signature.

WILLIAM A. HALL.